June 12, 1956   H. KUNEL   2,749,959
VEHICULAR TIRE
Filed Oct. 14, 1952   2 Sheets-Sheet 1

Inventor
Heinrich Kunel

United States Patent Office 2,749,959
Patented June 12, 1956

2,749,959

VEHICULAR TIRE

Heinrich Kunel, Rehau, near Hof, Upper Franconia, Germany

Application October 14, 1952, Serial No. 314,656

Claims priority, application Germany October 19, 1951

9 Claims. (Cl. 152—202)

This invention relates to a tire of rubber or similar materials for vehicles, and more particularly to a tire which may be used without an inner tube and which does not require internal air pressure.

The many disadvantages of pneumatic tires which are used almost exclusively today are sufficiently well known. As can be seen from the voluminous technical literature on this subject, a great number of suggestions has been made to produce a tire which would possess all the advantages of the pneumatic tire without being afflicted with its disadvantages.

In order to increase the strength of conventional tires which essentially consist of layers of rubber and textile fabrics, it has already been proposed to introduce stiffening inserts of metal wire netting. It has, however, been found that such constructions do not fulfill the expectations entertained. On the contrary, the metal contributed to the destruction of the tires. This was due to the fact that the wires rubbed strongly against each other at the crossing points, which caused the rubber at these points to separate from the wires, and destruction proceeded quickly from those points. The undesirable heat of friction created at the crossing points weakened the material further.

It has also been known to weld steel wire netting electrically at the crossing points. But this measure eliminated the existing shortcomings only partially.

Thus, the primary object of my invention is to generally improve known tires.

More specifically, an important object of the invention is to provide an improved tire construction.

Another object is to provide a tire which is used without an inner tube and without internal air pressure.

Other objects and advantages of the invention will become apparent from the subjoined detailed description and the accompanying drawings, in which drawings Fig. 1 is a section through a tire mounted on a wheel rim and fastened thereto;

Figure 1:
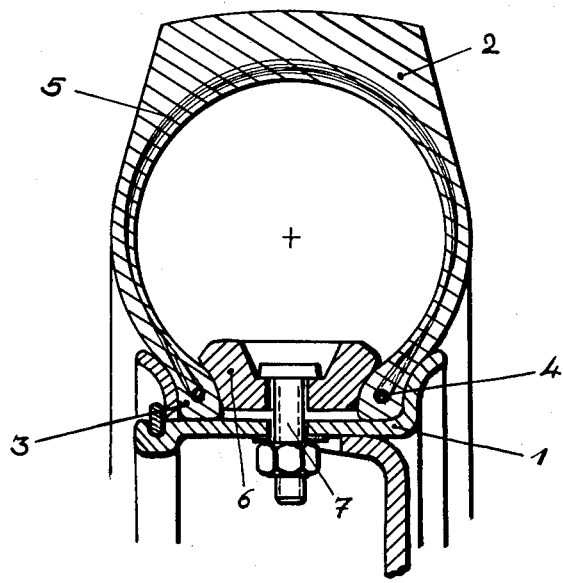

Referring to the drawings, and more particularly to Fig. 1, a tire 2 is mounted on a rim 1. The tire, as far as its general formation is concerned, is similar to known pneumatic tires. Steel wire ropes 4 are inserted in the beads 3, and layers 5 of textile fabrics are inserted in the body of the tire. The edges of the layers 5 are wound around the ropes 4 and fastened thereon in a known manner. The tire is fastened to the rim 1 by means of a suitably shaped connecting member 6 which bears upon the beads 3 and is secured to the rim by screws 7.

Figure 2:
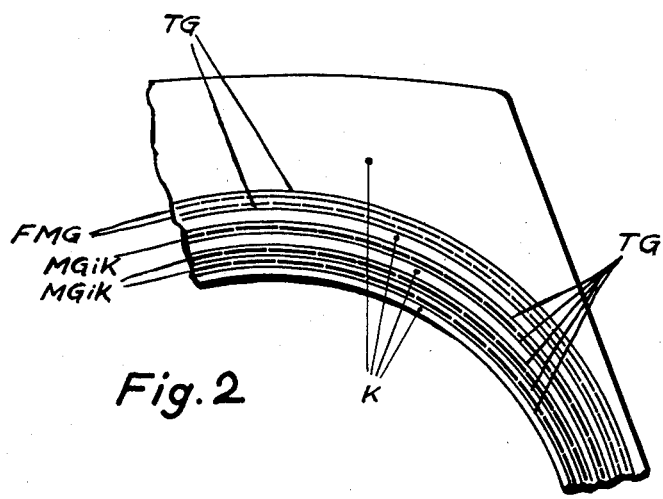
Fig. 2 is a fragmental view of the tire of Fig. 1, drawn to enlarged scale.

In Fig. 2, a tire construction according to the invention is shown. In the body K of rubber there are inserts of metal wire grates MGiK inserted. The rubber sections enclosing the wire grates are separated by textile fabric inserts TG. It will be seen that the grate-enclosing rubber sections may be very close to each other though not in contact and may be separated from each other by a rubber thickness as well. FMG designates finely meshed highly elastic metal nets.

Figure 3:
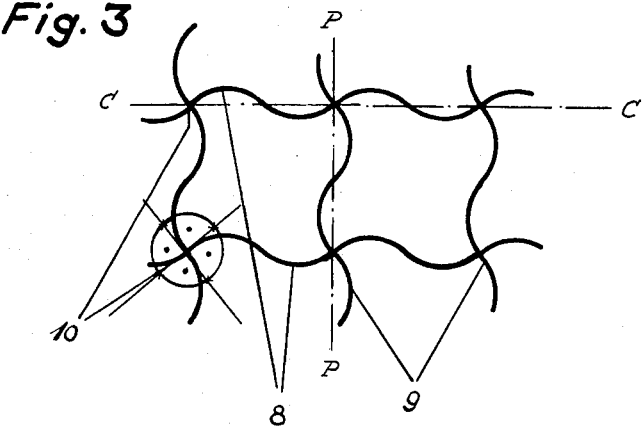
Fig. 3 is a fragmental plan view of a wire grate.

From Fig. 3 it will be seen how wires 8 and 9 of a metal wire grate meet at right angles at their crossing points 10. Tangents drawn to the wire curves at these points form certain angles with the direction of the tire circumference and with the direction perpendicular thereto. These directions are designated C—C and P—P, respectively, and the angles shown are of a preferred magnitude.

Figure 4:
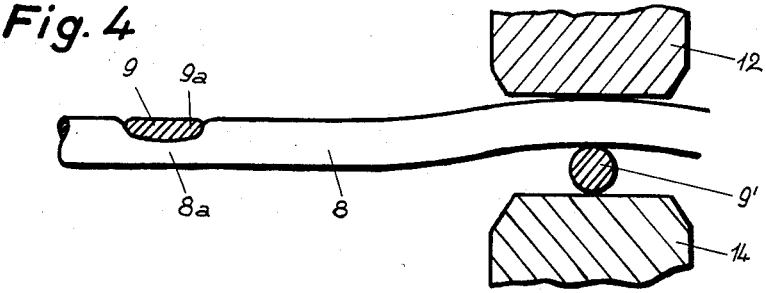
Fig. 4 is a section through the wire grate and is explanatory of the manufacture of the grate.

According to Fig. 4, a wire 8 is welded together with a wire 9, whereas a wire 9' is shown to be welded to the wire 8 by means of rollike electrodes 12 and 14. Before welding, the wires are shown to have circular cross section throughout, and after welding, the wire portions 8a and 9a appear flattened.

Figure 5:
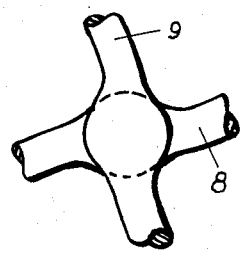
Fig. 5 is a plan view illustrating a welded point of intersection of two crossing wires of the wire grate.

Fig. 5 illustrates a point of intersection of two wires 8 and 9 when welded together.

It is believed that the construction of the tire according to my invention, as well as the many advantages thereof, will be understood from the foregoing detailed description. Some of the features and advantages are reviewed hereinafter.

I use one or more steel wire grates which are embedded in the body of the tire, each wire being crimped in a wavy pattern, and the waves of all wires of a grate lying in a single plane which is the plane of the grate or grates. At the crossing points, the wires of a grate are rigidly connected, preferably by welding.

The wavy wires impart to the tire not only high strength but also adequate elasticity. The wire grate of the invention when embedded in a tire is able to yield elastically in all directions.

When spring steel wire is used and the grates become deformed, the grates always regain their original shape.

It is important to make the crossing wires meet at right angles or at angles which are as close to right angles as possible, thus avoiding any undesirable transversal stresses and tensions particularly when under load. This is especially true for grate inserts the longitudinal wires of which are parallel to the circumference of the tire.

In order to cause the forces which are generated under load conditions to act primarily in the plane of the grate which is, as has been mentioned, also the plane of the wave-shaped wires, the wire grate is rolled down. This is preferably done during the welding operation by using electrodes having the shape of a rod, roller or drum and which press the superposed wires upon each other at the crossing points.

I prefer to completely embed the metallic grates in rubber before using the grates in the construction of the tire. According to one feature of the invention, I insert layers of textile fabrics between the rubber-embedded grates.

Depending on the type of tire produced, one or several metal wire grates are incorporated in the tire. Whenever more than one grate is used, I use a grate having its wires, respectively, parallel with and perpendicular to the tire circumference, the next following grate having its wires at different predetermined angles with respect to the circumference.

The strength and elasticity of my tire may be modified by modifying any one of the following conditions:

(1) Number of wires used in the grate;
(2) Material and diameter of the wires used;
(3) Number of grates incorporated in the tire;
(4) Angle between the wires and the circumference of the tire.

For increased strength of the tread of the tire, those wires of the grates that run parallel to the tire circumference are spaced closer together in the area of the tread than in the side walls. The distance between the parallel wires may again increase toward the beads.

In order to protect tires securely against the penetration of foreign bodies, I provide one or several highly elastic metal nets as inserts, preferably close to the tread or running surface. These nets are closely meshed and consist of fine steel wires which are also welded together at their crossing points. For improved elasticity, the nets are preferably arranged so as to form a certain optimum angle with the circumferential direction.

While the steel wire grates of the invention may be built into pneumatic tires and are of advantage in such tires, they are primarily intended for tires the elasticity and strength of which does not depend on an internal air cushion but is due to the inserts of the invention. My invention permits the manufacture of tires which do not have the disadvantage inherent in pneumatic tires but have all their advantages.

It will be apparent that while I have shown and described my invention in a few forms only, many changes and modifications may be made without departing from the spirit of the invention defined in the following claims.

I claim:

1. Vehicular tire of rubber or similar resilient materials, comprising at least a single insert of a metal wire grate, each of the wires of said grate being crimped to give a wavy appearance, the waves of the wires of the grate lying in the plane of the grate, and the wires of the grate being rigidly connected at the points of intersection.

2. In the tire according to claim 1, more than one wire grate, the wires of one grate running, respectively, parallel, and perpendicular, to the circumference of the tire, and the wires of the next following grate extending at different angles with respect to the tire circumference.

3. In the tire according to claim 1, the wires of the grate that extend in the direction of the circumference of the tire being more closely spaced near the running surface of the tire than in the side walls.

4. The tire according to claim 3 being provided with two beads, in which tire the distance between said more widely spaced wires in the side walls increases toward the beads.

5. In the tire according to claim 1, at least one highly elastic net of fine steel wires, said net being arranged close to the running surface of the tire, the wires of said net being rigidly connected at their points of intersection.

6. Process for making a tire of rubber or similar resilient materials, the tire comprising at least a single insert of a metal wire grate, comprising the steps of giving the grate-forming wires a wavy appearance, the waves lying in a single plane, rolling the wires of the grate down, welding the wires together at the points of intersection, embedding each grate in rubber or similar materials, and incorporating the grate-rubber structure in the tire.

7. In the process according to claim 6, incorporating in the tire layers of textile fabrics between the grate-rubber structures.

8. In the tire according to claim 1, a plurality of wire grates, the wires of said grates being crimped, the waves of the wires lying substantially parallel to the circumference of the tire.

9. In the tire according to claim 1, the superposed wire portions in the regions of intersection being compressed approximately to the thickness of a single wire.

References Cited in the file of this patent

UNITED STATES PATENTS

| Number | Name | Date |
|---|---|---|
| Re. 23,235 | Hawkinson | May 30, 1950 |
| 692,397 | Wilkinson | Feb. 4, 1902 |
| 1,083,231 | Wale | Dec. 30, 1913 |
| 1,111,419 | Wadsworth | Sept. 22, 1914 |
| 1,143,265 | Gautier | June 15, 1915 |
| 1,144,079 | Tew | June 22, 1915 |
| 1,145,993 | Hunter | July 13, 1915 |
| 1,410,704 | Mitchell | Mar. 28, 1922 |
| 1,553,438 | Gauntt | Sept. 15, 1925 |
| 1,561,759 | Wetmore | Nov. 17, 1925 |
| 2,006,038 | Yamaki | June 25, 1935 |
| 2,164,481 | Watkins | July 4, 1939 |
| 2,180,486 | Tench | Nov. 21, 1939 |
| 2,496,932 | Burkley | Feb. 7, 1950 |
| 2,523,182 | Battaglia | Sept. 19, 1950 |
| 2,542,871 | Johnson | Feb. 20, 1951 |